D. McCOMB.

Improvement in Wire-Ties for Bales of Cotton and Like Material.

No. 130,519. Patented Aug. 13, 1872.

Witnesses:
T. C. Brecht,
John R. Young

Inventor:
Mary A. McComb,
(Admix of Estate of David McComb)
By Prindle and Co. her Attys

UNITED STATES PATENT OFFICE.

MARY A. McCOMB, (ADMINISTRATRIX OF DAVID McCOMB, DECEASED,) OF MEMPHIS, TENNESSEE.

IMPROVEMENT IN WIRE TIES FOR BALES OF COTTON AND LIKE MATERIAL.

Specification forming part of Letters Patent No. 130,519, dated August 13, 1872.

*To all whom it may concern:*

Be it known that DAVID McCOMB, of Memphis, in the county of Shelby and State of Tennessee, did invent certain new and useful Improvement in Bale-Ties; and it is hereby declared that the following is a full, clear, and exact description of the same, reference being had to the accompanying drawing making a part of this specification, in which—

Figure 1:
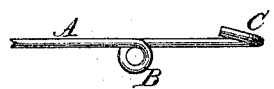
Figure 3:
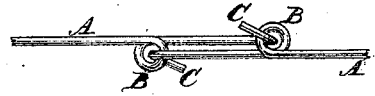
Figure 2:
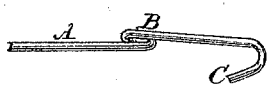
Figure 4:
Figure 5:
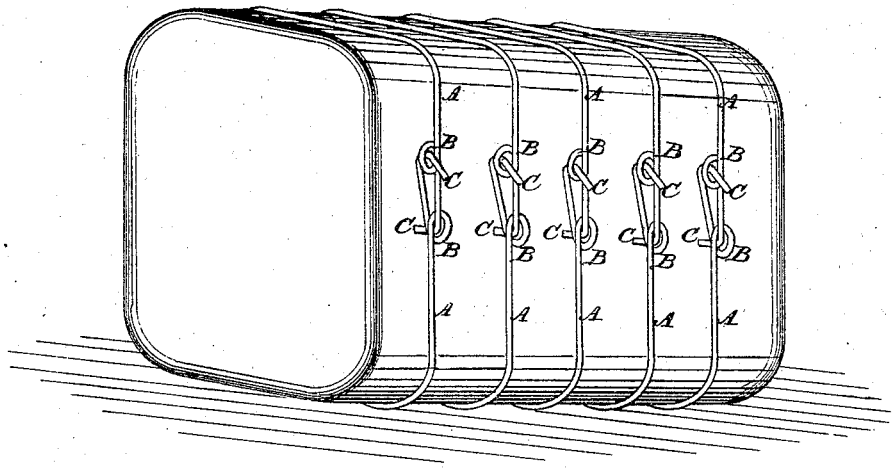

Figures 1 and 2 are, respectively, an edge view and a side elevation of the hook end of a band for confining a bale. Figs. 3 and 4 are, respectively, a plan and an edge view of the fastening as in use; and Fig. 5 is a perspective view of a bale with its bands secured by means of my device.

Letters of like name and kind refer to like parts in each figure.

The object of this invention is to furnish a simple, cheap, and efficient means for connecting together the ends of wires used for confining fibrous materials in bales; and it consists in connecting the ends of two wires by means of a hook and an eye formed upon each wire, and combined with the similar opposite devices of the other wire, substantially as and for the purpose hereinafter specified.

In constructing this fastening annealed wire A is employed, and at a point about four inches from each end form an eye, B, by coiling said wire once around. The end of the wire is then bent inward so as to form a hook, C, which has a plane at a right angle to the plane of the eye B. As thus arranged the ends of the wire are combined by passing the hook of each through the loop or eye of the opposite end, after which, by releasing the bale from pressure its expansive force will cause it to fill the tie and produce such a tension of the same as to draw the eyes together and cause them to closely grasp said hooks, by which means said parts are so firmly united as to afford perfect security against separation.

While this attachment is more especially intended for use in connection with bale-ties, it will be readily seen that it is equally applicable wherever two wires are to be joined and a constant tension exists.

Having thus fully set forth the nature and merits of the invention of David McComb, deceased, what is claimed as new is—

The improved method of connecting together the ends of wire for baling and other purposes, by means of a hook and eye formed on each of said ends, and combined for operation substantially as shown and described.

D. McCOMB.

Witnesses:
JAMES W. McFARLAND,
W. EDWARD BOOTH.